J. M. SEGAR.
GRILLER.
APPLICATION FILED AUG. 30, 1920.

1,398,157.

Patented Nov. 22, 1921.
2 SHEETS—SHEET 1.

Inventor
J. M. Segar

Atty

J. M. SEGAR.
GRILLER.
APPLICATION FILED AUG. 30, 1920.
1,398,157.
Patented Nov. 22, 1921.
2 SHEETS—SHEET 2.
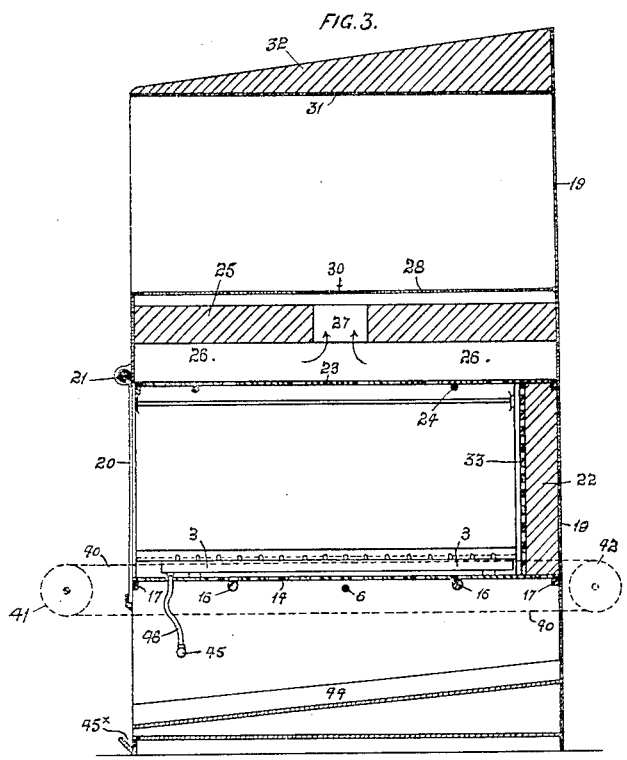
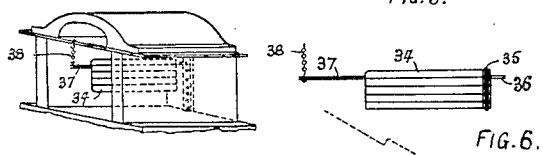
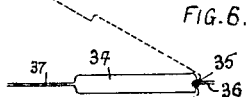
Inventor
J. M. Segar

UNITED STATES PATENT OFFICE.

JOHN MATTHEW SEGAR, OF LIVERPOOL, ENGLAND.

GRILLER.

1,398,157.  Specification of Letters Patent.  Patented Nov. 22, 1921.

Application filed August 30, 1920. Serial No. 407,020.

*To all whom it may concern:*

Be it known that I, JOHN MATTHEW SEGAR, a subject of the King of England, and residing at Liverpool, in the county of Lancaster, England, have invented Improvements in Grillers, of which the following is a specification.

This invention has reference to grillers heated by gas or electricity, and of the type in which the heat imparted to the article being grilled or cooked is radiant heat radiated by and from the gas or electricity heated elements; and one of the chief objects and effects of the invention is to provide a griller by which grilling or cooking of edible articles, such as chops, steaks, fish, bread and the like, can be effected more rapidly, and uniformly, and with less attention than such operations generally require.

Figure 1:
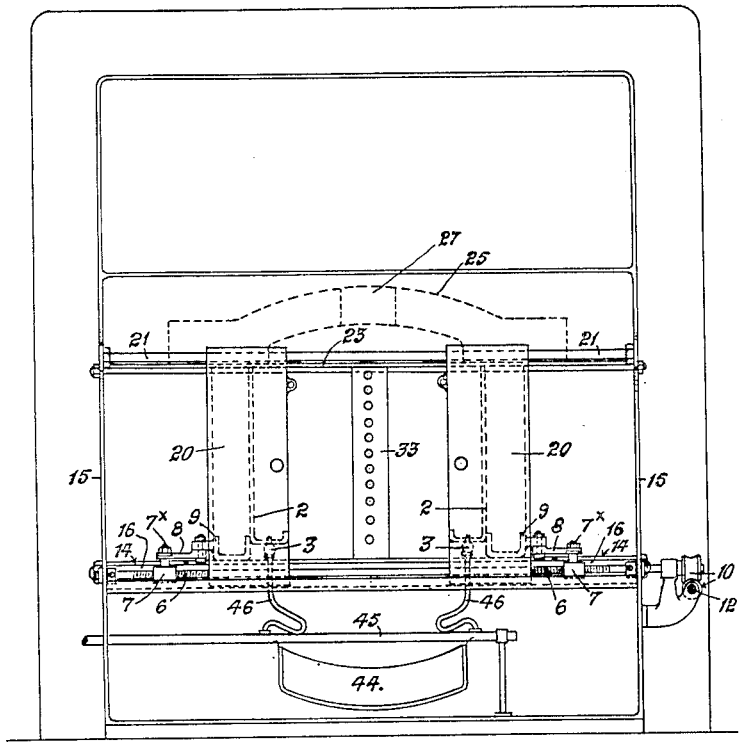
Figure 2:
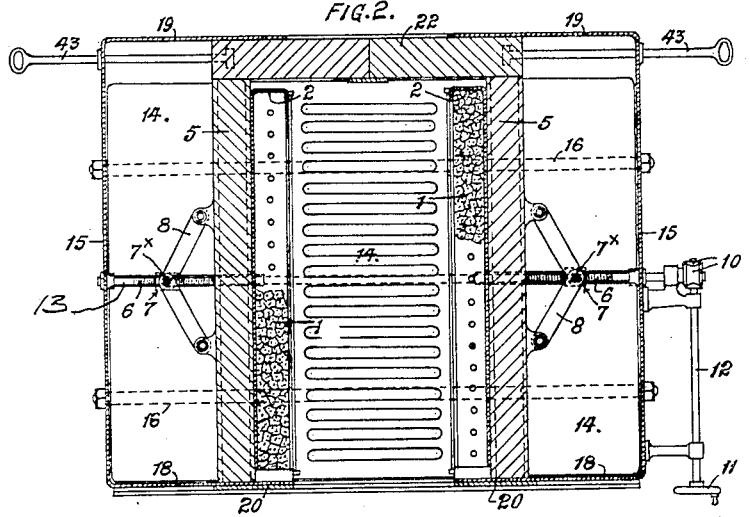

The invention will be described with the aid of the accompanying drawings, which illustrate it, and in which Figure 1 is a front elevation, Fig. 2 a plan in section, Fig. 3 a cross section, and Figs. 4, 5 and 6 details.

In the griller shown in the drawings, the heating medium is gas, and the invention will be mainly described as applied to a gas heated griller.

The griller has two oppositely disposed and relatively adjustable heating elements, 1, consisting in the case shown, of pieces of refractory material such as are commonly used in gas fires, held within a container or carrier 2 of metal, at the bottom of which are the gas burners 3; and the heat of combustion of the gas makes this material of the heating elements red hot, as in ordinary gas fires.

The elements 1 are attached to fire bricks 5 which can be moved, and so adjust the heating elements closer together or farther apart, this movement being effected by a screwed rod 6, working through nuts 7, which are connected by links 8 to lugs on the castings 9, which carry the backs 5; the shaft 6 being rotated by gear wheels 10 operated by a hand wheel 11 at the front of the griller on a shaft 12, which operates the gear wheels.

Beneath the above parts there is a grid plate bottom 14 to the cooking chamber; the plate being provided with a slot 13 where the pin 7× on the nut 7 passes up through this plate to the links 8.

The plate is supported by rods 16, and ledges 17 on the front and back plates 18 and 19 of the griller.

The griller has sliding front doors 20 for closing or opening the grill chamber, these doors being supported on a rod 21 on the front plate 18.

The roof of the cooking space or chamber is formed by a plate 23 supported on rods 24, and having suitable gas discharge openings in it; and above it is a fire brick arch 25, the sides of which rest on the plate 23, and the center portion of which forms a flue 26, into which the gases of combustion and fumes from the cooking chamber pass, whence they escape by a hole 27 to a space under a "hot plate" 28 which extends across the griller, and is heated by the waste gases, and the upper surface of which is used as a place for heating pans, or keeping food hot, and the like. It has a removable cover 30 over the hole 27, which when removed and a saucepan or kettle placed over it, enables the water or liquid in it to be heated or boiled.

Above the plate 28 is a roof plate 31, which together with the plate 28 and the plate 19, forms a chamber having an open front, which serves as a warming or hot chamber; the roof 31 having a suitable lagging 32 upon it.

At the back of the cooking chamber is a flat bar 33 with holes in it, which is detachably supported in position, and can be readily placed in position or removed. It serves as a support to a holding device for carrying meat, bread, fish or the like, to be cooked, shown in Figs. 4, 5 and 6. It consists of open wire work folding sides 34 hinged at 35, and having a spike 36 which can be inserted in any of the holes in the bar 33, while the front arms 37 are suitably supported from above by a chain 38. Fig. 4 shows this device in position.

The article to be cooked is placed between the members 34, which when closed are put in the position described.

In some cases, the food may be passed through the front and out through the back of the grilling chamber by conveyer chain 40 (see Fig. 3) passed over front and back wheels 41, 42, suitably supported on shafts. The chain would have devices on it adapted to receive food carrier devices (say similar to that shown in Fig. 5), and holds the article to be cooked upright as it passes through the cooking chamber. The conveyer could be slowly worked by electric or other power, or by hand. When the conveyer is used, the bar 33 is removed, and the back fire bricks 22 pulled back by means of rods 43, so that they will be the required distance apart. The conveyer chain 40 will be adapted to be readily taken down and placed in position as and when required, in any known way.

The food holders carried by the chain, will be discharged from the back of the oven as they pass down over the wheel 42.

When it is not expedient to use the food carrier shown in Fig. 5 for supporting the food to be cooked, a pan or plate may be used which will be supported by the grid or the food may be placed directly on the grid.

Beneath the part of the bottom plate 14, in which the grids or openings exist, that is the center portion, under the cooking chamber, there is an inclined drip pan 44, by which the drippings are caught, and flow down it into the drip gutter 45 in the front.

Gas is supplied to the burners 3 by a gas pipe 45 and flexible pipes 46, between it and the burners 3.

By this grilling apparatus, the articles to be cooked are subjected to the radiant heat of the opposite heating elements 1; from both sides at once; and in consequence, the cooking is very quickly and uniformly effected, and chops, steaks and the like can be grilled in very much less time than usual.

While the invention has been more especially described as applied to a griller in which the heating medium is gas, other heating medium may be employed, such as spirit or oil jet or vapor flames or heating elements heated by electricity.

What it claimed is:—

1. A grilling apparatus comprising a chamber, a grid forming the base of said chamber, heat radiating elements overlying and supported by the grid and extending above the same to form side walls of a grilling chamber, heating means carried by said elements, and a single means coöperating with both of said elements and adapted in movement to simultaneously and uniformly adjust said elements in relatively opposite directions, whereby the space between said elements may be varied to subject the article being grilled to the desired heat.

2. A grilling apparatus comprising a chamber having fire brick sections arranged therein, means whereby said sections may be simultaneously and similarly adjusted toward or from each other, heating elements carried by said sections and a grid over which said sections are movable, the upper portion of the chamber having a metallic plate formed with openings, a fire brick portion overlying the said plate, a heating chamber overlying the fire brick portion and having a bottom plate spaced from said fire brick portion, said fire brick portion being formed with an opening to direct the heating products of the heating elements into contact with said bottom plate.

3. A grilling apparatus comprising a heating chamber, a grid forming the bottom of said chamber, heat radiating elements slidably mounted on the grid and extending above the same to form side walls of said chamber, a single means for adjusting the heat radiating elements in opposite directions, so that the heat to which the article being grilled is subjected, may be varied.

4. A grilling apparatus comprising a chamber having fire brick sections arranged therein, means whereby said sections may be simultaneously and similarly adjusted toward or from each other, heating elements carried by said sections and a grid over which said sections are movable, fire brick sections forming the rear of the chamber and relatively adjustable to provide a space between them, and an article conveyer adapted to pass through the chamber and between the spaced rear portions.

5. A grilling apparatus comprising a heating chamber, a grid forming the bottom of said chamber, heat radiating elements slidably mounted on the grid and extending above the same to form side walls of said chamber, a single means mounted below the grid for adjusting the heat radiating elements in opposite directions, a perforated plate forming the top of said chamber, a fire brick portion mounted on said perforated plate, and a heating chamber overlying the fire brick portion having a bottom plate spaced above the fire brick portion, the said fire brick portion having a central opening for directing the heat from the heating chamber against said bottom plate.

In testimony whereof I have signed my name to this specification in the presence of two subscribing witnesses.

JOHN MATTHEW SEGAR.

Witnesses:
CLIFFORD F. ROYSTON,
SHELAGH DONALDSON.